(12) United States Patent
Shalvi et al.

(10) Patent No.: US 6,647,070 B1
(45) Date of Patent: Nov. 11, 2003

(54) METHOD AND APPARATUS FOR COMBATING IMPULSE NOISE IN DIGITAL COMMUNICATIONS CHANNELS

(75) Inventors: Ofir Shalvi, Herzlia (IL); Mordechai Segal, Herzlia (IL); Zvi Reznic, Tel Aviv (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/392,598

(22) Filed: Sep. 9, 1999

Related U.S. Application Data
(60) Provisional application No. 60/099,703, filed on Sep. 10, 1998.

(51) Int. Cl.[7] .............................. H04B 15/00; H04L 23/02
(52) U.S. Cl. ...................................... 375/285; 375/263
(58) Field of Search .................. 348/21, 192; 375/222, 375/233, 285, 240, 295, 348, 357

(56) References Cited

U.S. PATENT DOCUMENTS

| | | | | |
|---|---|---|---|---|
| 3,617,948 A | * | 11/1971 | Lucky ........................ 333/166 |
| 4,672,633 A | * | 6/1987 | Claasen et al. ............. 375/285 |
| 4,674,125 A | * | 6/1987 | Carlson et al. ............. 382/191 |
| 5,416,767 A | * | 5/1995 | Koppelaar et al. .......... 370/210 |
| 5,450,457 A | * | 9/1995 | Ito et al. ..................... 375/355 |
| 5,537,368 A | * | 7/1996 | O'Brien et al. ............. 367/135 |
| 5,586,100 A | * | 12/1996 | Lee et al. ................. 369/47.28 |
| 5,596,604 A | * | 1/1997 | Cioffi et al. ................. 375/260 |
| 6,094,464 A | * | 7/2000 | Ebringer et al. ............. 375/342 |
| 6,148,041 A | * | 11/2000 | Dent ........................... 375/340 |
| 6,243,412 B1 | * | 6/2001 | Fukawa ...................... 375/219 |
| 6,400,415 B1 | * | 6/2002 | Danielsons ................. 330/149 |

* cited by examiner

*Primary Examiner*—Stephen Chin
*Assistant Examiner*—Lawrence Williams
(74) *Attorney, Agent, or Firm*—Tammy L. Williams; W. James Brady, III; Frederick J. Telecky, Jr.

(57) ABSTRACT

This invention is particularly useful as a system for digital communications over channels that suffer from impulse noise, and particularly over return cable TV channels, downstream cable TV channels, and digital subscriber loops (DSL) channels for high speed communications over twisted pair copper lines.

8 Claims, 3 Drawing Sheets

METHOD AND APPARATUS FOR COMBATING IMPULSE NOISE IN DIGITAL COMMUNICATIONS CHANNELS

This application claims priority under 35 USC §119(e)(1) of Provisional Patent Application Ser. No. 60/099,703, filed Sep. 10, 1998.

FIELD OF THE INVENTION

The present invention relates to digital communications, and more particularly, to method and apparatus for combating impulse noise in digital communications channels.

BACKGROUND OF THE INVENTION

Impulse noise is typically characterized by a high power level during a short time period and a significantly lower power level during the rest of the time. Impulse noise is a major problem in several digital communications channels including high-speed CATV (cable TV) channels and high speed DSL channels. For example, in return CATV channels, impulse noise is considered as the primary channel impairment ("Results of Return Plant Testing", R. Prodan, 1997 National Cable Television Association (NCTA) Technical Papers). In certain CATV plants, noise impulses occur at a rate of thousands of impulses per second, with a typical duration of less than a micro-second, but the noise power during the impulses is higher than the power of the signal.

There are several approaches to combat impulse noise in digital communications channels (see, "Error Control Coding, Fundamentals and Applications", Shu Lin & Daniel J. Costello, Jr., Prentice Hall, Inc. Englewood Cliffs, N.J. 1983; "Digital Communications", John G. Proakis, third edition, McGraw Hill 1995):

1. Forward Error Correction (FEC) coding (for example, Reed-Solomon FEC). The disadvantage of this approach is that it requires spending a portion of the transmitted data for redundancy bits, thus reducing the information rate of the transmitter.
2. Using low symbol-rate signaling. When the symbol period (which is equal to the inverse of the symbol-rate) is much longer than the impulse duration, a conventional receiver reduces the effect of a noise impulse by applying a conventional matched filter. A drawback of this approach is that it degrades the data-rate attainable by a transmitter-receiver pair. It is possible to replace a high symbol-rate channel by multiple low symbol-rate channels, using a multi-tone approach; the overall data rate is not degraded, but this multi-tone approach will increase the complexity of the transmitter and receiver. A multi tone approach with low symbol-rate signaling is more robust than high symbol rate signaling for low-magnitude short-duration pulses, but less robust for high-magnitude short-duration pulses. With a lower symbol rate, the number of errors per second will be smaller than with higher symbol rate. However, the total number of symbols is also smaller, and hence the average error rate may stay unchanged.
3. Interleaving. The transmitter can interleave the transmitted FEC-encoded symbols over the time axis. This can improve robustness to noise impulses with durations longer than the duration of a FEC symbol (e.g. a character of Reed-Solomon FEC). But in a channel having frequent noise impulses at random times with an impulse duration significantly shorter than a FEC symbol, such an approach will have a marginal effect on the maximum rate of noise impulses that the system can tolerate. Another interleaving approach is calculating digital samples of the modulated waveform at a sampling rate much higher than the symbol rate, interleaving these data samples over the time axis, transmitting the interleaved samples, and performing a corresponding de-interleaving operation in the receiver. Such an approach can significantly improve robustness to impulse noise, as it spreads each impulse over multiple symbols at the de-interleaver output. However, such an approach may cause error propagation in case of a very high magnitude impulse; it also spreads the spectral density of the transmitted signal and therefore is not suitable to bandlimited modulations, such as QAM and PAM. It is more suitable to direct sequence code division multiple access (CDMA) approaches.

The present invention may be used in combination with other methods described herein before for combating impulse noise, resulting in an improved and higher robustness.

This invention is particularly useful as a system for digital communications over channels that suffer from impulse noise, and particularly over return cable TV channels, downstream cable TV channels, and digital subscriber loops (DSL) channels for high speed communications over twisted pair copper lines.

SUMMARY OF THE INVENTION

In one aspect, the present invention provides an apparatus for digital communication in noisy communications channels including a transmitter with a pre-filter designed to create deliberate inter-symbol interference so that a plurality of symbol intervals are included in the transmitted signal.

In another aspect, the present invention provides a method for digital communication in a noisy communications channel by creating inter-symbol interference in a transmitted signal and using a multiple symbol time interval in the received signal to reduce impulse noise.

In another aspect, the present invention provides a method for digital communication in a noisy communications channel by creating inter-symbol interference in a transmittal signal and using a multiple symbol time interval in the received signal to reduce impulse noise.

In another aspect, the present invention provides a digital transmitter having a forward error correction encoder for receiving an input data stream and providing an encoded output data stream, a filter having an impulse response with unity normalization and multiple taps with high magnitude for receiving and filtering said output data stream, and a modulator for modulating said filtered output data stream.

In another aspect, the present invention provides a digital transmitter having a forward error correction encoder for receiving an input data stream and providing an encoded output data stream, a filter for deliberately injecting inter-symbol interference into said output data stream, and a modulator for modulating said filtered output data stream.

In another aspect, the present invention provides a digital receiver having a demodulator for receiving an input data signal, down converting said signal, and sampling said signal to provide an input data stream, a smoother for receiving said input data stream, identifying data samples that are likely contaminated by impulse noise, and attenuating data samples likely contaminated by impulse noise, a filter and timing recovery portion for applying a square-root raised cosine filter to data samples output by said smoother and for determining the sample rate and sample clock phase, a filter for filtering the output from said filter and timing recovery portion having an impulse response sequence with a small peak to average ratio that attenuates the effect of impulse noise with a duration less than the duration of a symbol, an adaptive equalizer for receiving the output of said filter and compensating for carrier phase, undesired inter-symbol interference, and stationary noise components, a modified maximum likelihood sequence estimation (MLSE) decoder for applying a viterbi MLSE using a plurality of non-zero taps to determine a sequence of symbols in a data stream received from said adaptive equalizer, and a forward error correction (FEC) decoder that utilizes indications of samples contaminated with noise from said smoother to perform error correction on said data stream. In another aspect, the present invention provides a method for detecting a noise impulse in a data stream by associating an indication with a data sample, comparing the absolute value of the amplitude of said data sample with a first preselected threshold value, setting said indicator to a first predetermined value if said amplitude is greater than said first preselected threshold value, comparing said amplitude to a second preselected threshold value if said amplitude is less than said first preselected threshold value, setting said indicator to a second predetermined value if said amplitude is greater than said second preselected threshold value, and setting said indicator to a third predetermined value if said amplitude is less than said second preselected threshold value.

In another aspect, the present invention provides a method for attenuating a noise impulse in a data stream by determining a residual error value for a data sample, comparing the absolute value of the amplitude of said residual error value with a first preselected threshold value, modifying the amplitude of said data sample to a first predetermined value if said amplitude is greater than said first preselected threshold value, comparing said amplitude to a second preselected threshold value if said amplitude is less than said first preselected threshold value, and modifying the amplitude of said data sample to a second predetermined value if said amplitude is greater than said second preselected threshold value.

In another aspect, the present invention provides an apparatus for digital communication in noisy communications channels including a transmitter including a pre-filter for creating deliberate inter-symbol interference such that a plurality of symbol intervals are included in a transmitted signal, and a receiver having a detector constructed to combat impulse noise by using multiple symbol time interval diversity.

BRIEF DESCRIPTION OF THE DRAWINGS

The novel features believed characteristic of the invention are set forth in the appended claims. The preferred embodiments of the invention as well as other features and advantages thereof, will be best understood by reference to the detailed description which follows, read in conjunction with the accompanying drawings, wherein:

Corresponding numerals and other symbols refer to corresponding parts in the various figures of drawing, except where the context indicates otherwise.

DETAILED DESCRIPTION

The present invention is a new method and apparatus for digital communication in a channel that is contaminated by impulse noise. It allows significant reduction in error rate due to impulse noise and thus improves the robustness and the performance of the digital communications system.

The present invention is particularly useful for return CATV channels. It is compliant with the existing specification of CableLabs for high-speed communications over return CATV channels ("DOCSIS RF Interface Specification, SP-RFII01-970321", CableLabs, 1997). Thus applying the invention does not require any modification to the existing standard. Furthermore, applying the invention requires only an upgrade of the return path receiver (located in the headend of the CATV system), and it does not require any modification in standard compliant transmitters (that are located in the user' premises). Since a typical CATV system has hundreds of user' premises units per each headend unit, the added cost involved in applying the invention is very small compared to the overall system cost.

The present invention may be used in combination with other methods described herein before for combating impulse noise, resulting in an improved and higher robustness.

This invention is particularly useful as a system for digital communications over channels that suffer from impulse noise, and more particularly over return cable TV channels, downstream cable TV channels, and digital subscriber loops (DSL) channels for high speed communications over twisted pair copper lines.

Figure 1:
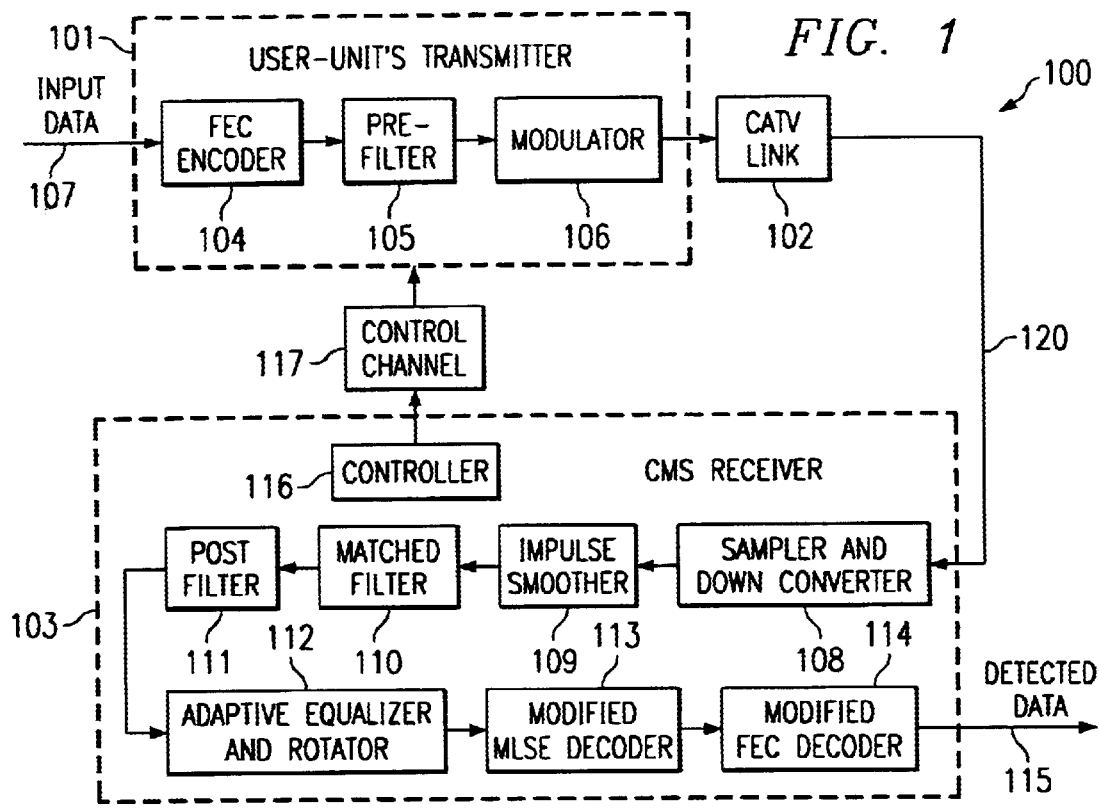
FIG. 1 depicts a simplified block diagram of a digital communication system using the teachings of the present invention.

Referring now to FIG. 1 there may be seen a simplified block diagram of an exemplary digital communication system 100 using the teachings of the present invention. Preferably, the system operates in a CATV return channel in compliance with CableLab' DOCSIS standard ("DOCSIS RF Interface Specification, SP-RFII01-970321", CableLabs, 1997).

The system 100 consists of a representative user's unit 101, CATV link 102, and a CMTS (Cable Modem Termination System) receiver 103 appropriately connected to the link 102 by a wire or other transmission media 120. The user's unit 101 includes an FEC encoder 104, a pre-filter 105, and a modulator 106. The encoder 104 transforms the input data bits 107 into QPSK or 16 QAM symbols at a symbol rate of 640,000 symbols/second using a Reed-Solomon forward error correction (FEC) technique, as is well known in the art. The data symbols are arranged in TDMA packets preceded by a preamble, allowing time sharing of the channels between multiple user' units.

The pre-filter 105 applies a linear filtering operation which can be T-spaced (i.e. the outputs of the filter are calculated once per symbol, T). Alternatively, the pre-filter 105 may employ a fractionally spaced configuration (i.e. the outputs of the filter are calculated more than once per symbol (e.g. twice per symbol)), or a Tomlinson configuration (i.e. IIR filter with modulo summation in the feedback loop). The Tomlinson configuration case is not compliant with the existing DOCSIS standard. The pre-filter's output is filtered by a square-root raised cosine transmission pulse and up-converted to passband in the modulator unit 106. The impulse response of the pre-filter 105 is constructed according to the following rules:

1. Unity norm (this preserves the transmitted power).
2. Wide spreading over the time domain (i.e. multiple taps with high magnitude, which allows time diversity in the signal).
3. Its inverse filter also has wide spreading over the time domain (so that it reduces the effect of impulse noise whose duration is shorter than the time-span for the inverse filter), and has a small norm (so that it does not amplify white channel noise components). The inverse filter transfer function is defined as S(z)/F(z), where F(z) is the transfer function of the pre-filter, and where S(z) is the transfer function of the overall filter; S(z) is a filter that has a small number of non-zero taps. A specific functional representation for S(z) is $1+az^{-N}$, where a is a coefficient and where N is an integer.

Figure 3A:
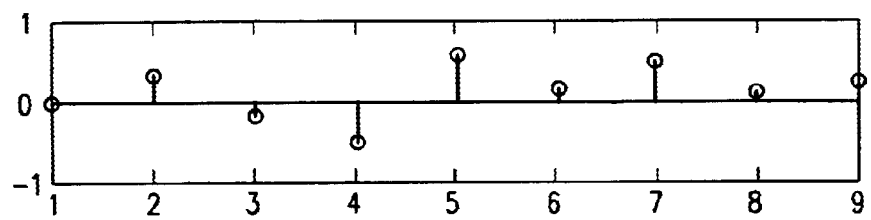
FIGS. 3a, b, and c depict an example of impulse response sequences of a pre-filter, a post filter, and a resulting overall filter, respectively, all operating according to the teachings of the present invention.
Figure 4A:
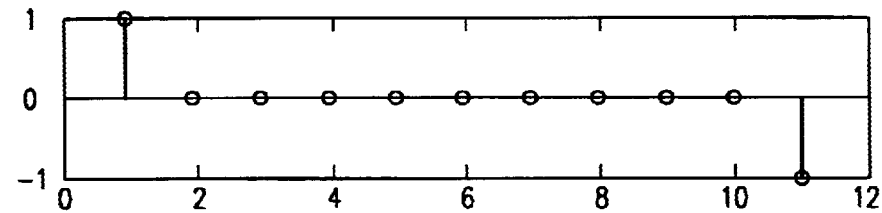
FIGS. 4a, b, and c depict another example of impulse response sequences of a pre-filter, a post filter, and the overall filter results, respectively, all operating according to the teachings of the present invention.

FIGS. 3a and 4a show impulse response sequences of filters employing the above rules and are described more fully later herein.

Prior art pre-filters (also called "pre-equalizers") are designed to minimize inter-symbol interference (ISI) by reducing or equalizing a channel's ISI. In contrast, the present invention's pre-filter 105 is designed to deliberately cause ISI, so that the time diversity in the transmitted signal will allow for combating impulse noise.

The transmitted signal is passed through CATV link 102, where it is contaminated by stationary noise (i.e., noise whose power level does not vary quickly), and by impulse noise that is characterized by typical impulse durations of 0.1–1 microsecond, and by magnitudes that may be higher than the signal's magnitude.

The output of the link 102 over wire or other transmission media 120 is processed by the sampling and down-converter unit 108, where it is down-converted from passband to baseband, and sampled at a sampling rate that is 64 times the symbol rate (i.e. 40,960,000 Hz).

Figure 2:
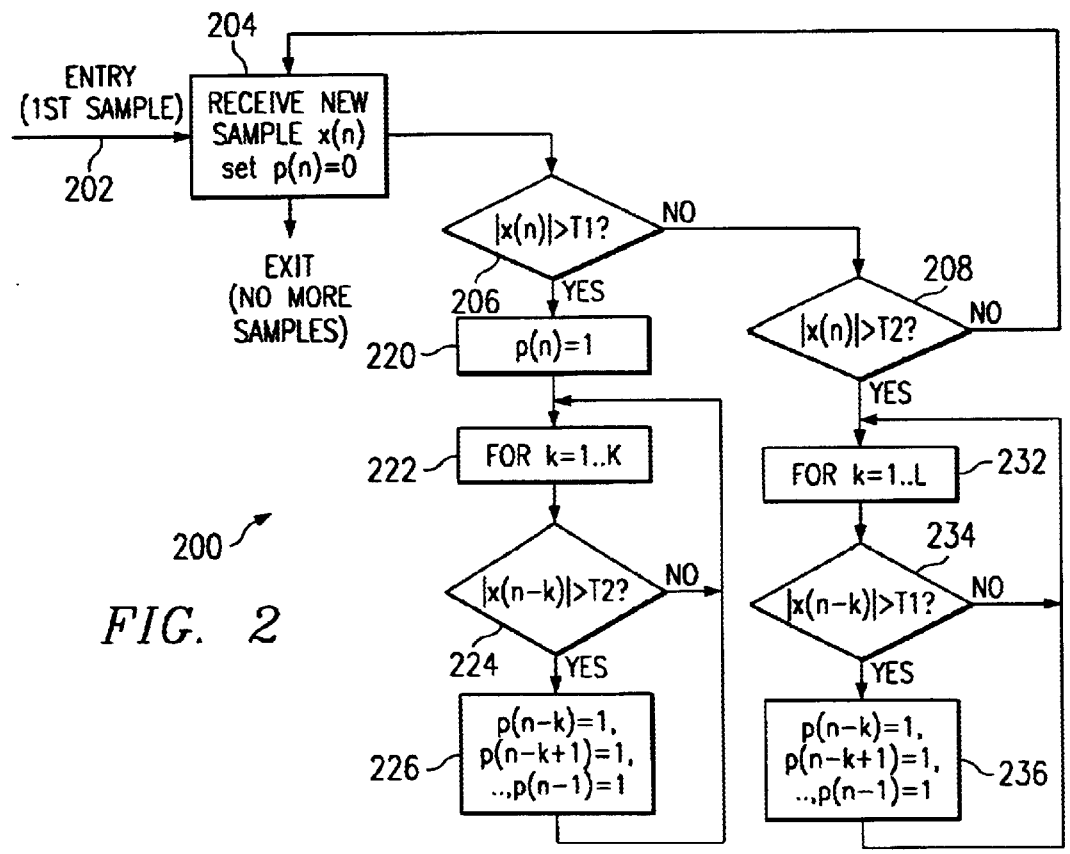
FIG. 2 illustrates a flow chart for an impulse identification process of an impulse filter operating according to the teachings of the present invention.

The impulse smoother unit 109 identifies data samples that are likely to be contaminated by impulse noise of high level. The impulse identification process of the impulse smoother is based on identification of sequences of samples having high magnitudes. The indications of impulse noise detected by this process are fed to units 110–114 and 116. FIG. 2 depicts an impulse identification process 200 that is utilized in the preferred embodiment system 100 of FIG. 1.

FIG. 2 depicts a flow chart for the steps of an impulse identification process 200 of an impulse smoother 109 operating according to the teachings of the present invention. This process 200 identifies sequences of samples having large magnitudes. In more detail, each data sample is provided as an input to the impulse identification process 200, via the "ENTRY" arrow 202 in the block 204 in the upper left-hand side of FIG. 2. For each new data sample, the value of its corresponding p(n) is initially set to zero in block 204 and then the absolute value of the data sample is compared to a first threshold value, T1, in decision block 206. If the sample is less than this first threshold, its value is then compared to a second threshold value, T2, in decision block 208, where T1>T2 and both are >0. If the sample value is also less than this second threshold value, it is not identified as a noise impulse and its corresponding p(n) is left set to zero. The data sample, x(n), and its corresponding p(n) value are then temporarily stored for later use by other blocks or portions of FIG. 1.

Continuing to refer to FIG. 2, let n2 be the index of a data sample that satisfies x(n2)>T1. Let n1 be the smallest index in the range [n2−K,n2−K+1 . . . ,n2−1] that satisfies x(n1)>T2 test of block 224. Let n3 be the largest integer in the range [n2+1,n2+2, . . . ,n2+K] that satisfies x(n3)>T2 test of block 208. Then n1 is identified as the beginning of the noise burst and n3 is identified as the end of the noise burst, and the p(n) for all n in the range [n1–n3] are set to one (blocks 226 and 236).

The impulse smoother 109 also attenuates the data samples according to the estimated likelihood that the data sample is contaminated by an impulse noise; that is, if the estimated likelihood is low then the sample is not attenuated, and if the likelihood is higher then the sample is attenuated. The following non-linear functional representation is an illustrative example of one such implementation of this attenuation scheme:

$$y = \begin{cases} x & |x| < A \\ A\,sign(x) & A \leq |x| < B \\ C\,sign(x) & |x| \geq B \end{cases}$$

Where x and y are the input signal and output signal, respectively, of the impulse smoother 109 and where B>A>0 and C are coefficients obtained from the receiver 103. When using such a function, the output of the noise smoother 109 approximates the conditional mean estimate of the noise-free input of the unit in the presence of impulse noise.

In an alternative embodiment, the order of the impulse smoother unit 109 and sample and down converter unit 108 are interchanged; so that, unit 109 is connected to unit 102 (via line 120) and to unit 108, and unit 108 is connected to unit 109 for its input and supplies its output to unit 110.

The matched filter and timing unit 110 applies a square-root raised cosine filter to the output of the impulse smoother unit 109. Unit 110 also estimates the symbol clock phase of the signal and decimates it to a sampling rate equal to the symbol rate, or twice the symbol rate, using well known techniques; unit 110 selects a sampling phase that matches the estimated symbol clock phase using well known techniques.

Figure 3B:
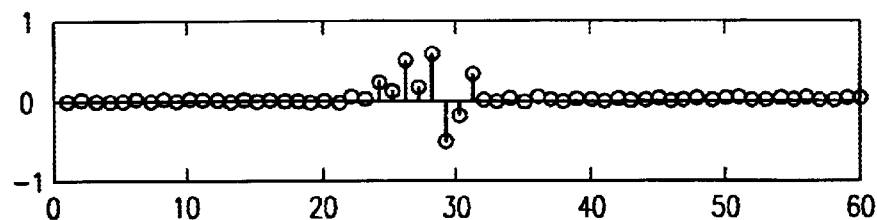

The post-filter unit 111 applies a filter that is constructed so that its convolution with the pre-filter in unit 105 will approximately yield an impulse response of an overall filter S(z) that has a small number of non-zero taps, as explained above. Filter 111 is designed to have an impulse response sequence that has a small peak to average ratio (i.e. the ratio between the power of the maximal tap of the sequence and the norm of the sequence), so that it attenuates the effect of an impulse noise whose duration is shorter than the duration of a symbol. FIGS. 3b and 4b illustrate the impulse response of two post-filter 111 impulse response sequences, which correspond to the pre-filters shown in FIGS. 3a and 4a, and to the overall filters whose impulse response sequences are shown in FIGS. 3c and 4c.

Figure 3C:
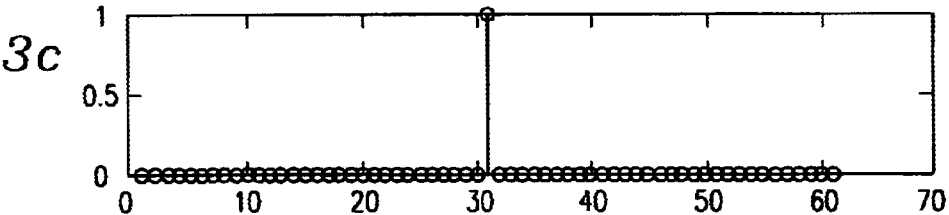
Figure 4B:
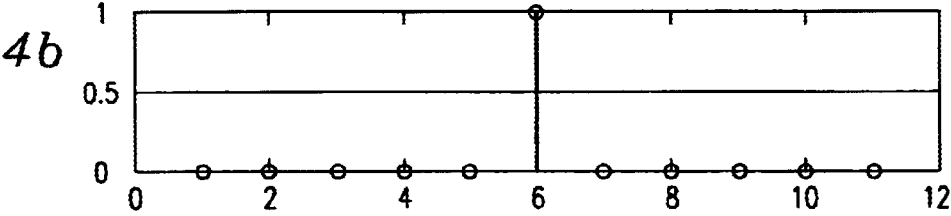

FIGS. 3a, 3b, and 3c depict one example of an impulse response sequence of a pre-filter, a post-filter, and the corresponding overall filter operating according to the teachings of the present invention, respectively. In FIGS. 3a, 3b, and 3c, the Y axis is normalized amplitude and the X axis is sample number (sample index). The sample rate can be either the symbol rate or twice the symbol rate, depending upon the output rate of filter unit 110.

In more detail, the impulse response sequence of the pre-filter 105 shown in FIG. 3a is −0.0117, 0.3141, −0.2227, −0.5175, 0.5334, 0.1588, 0.4662, 0.1255, 0.2023. The sum of squares of this sequence is 1, meaning that the pre-filtering operation does not change the power of the transmitted sequence. The post-filter 111 is exactly the inverse filter of the pre-filter, and it is shown in FIG. 3b. The overall filter, which is a delta function, is shown in FIG. 3c. The sum of squares of the impulse response of the post-filter 111 is 1.009; that is, the post-filter 111 causes to a small degradation of 0.04 dB in noise margin for stationary additive white noise. The square of the maximal tap of the impulse response of the post-filter 111 is 0.2987 of the sum of squares of the taps of the impulse response of the post-filter; thus, the energy of an impulse of noise with a duration of up to one symbol will be split by the post-filter 111 between several symbols, and no more than 0.2987 of the power of the impulse will effect a single symbol at the output of the pre-filter 105. This provides an improvement of 5.25 dB in impulse noise robustness.

Figure 4C:
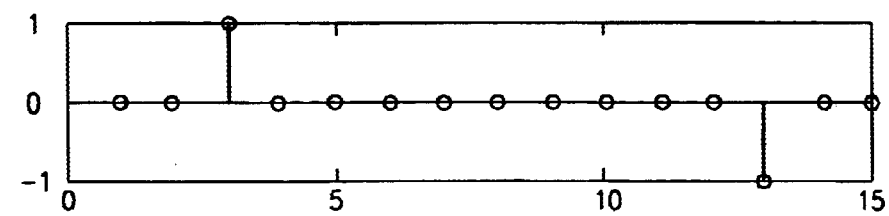

FIGS. 4a, 4b, and 4c depict another example of an impulse response sequence of a pre-filter, a post-filter, and corresponding overall filter operating according to the teachings of the present invention, respectively. In FIGS. 4a, 4b, and 4c, the Y axis is normalized amplitude and the X axis is sample number (sample index). The sample rate can be either the symbol rate or twice the symbol rate, depending upon the output rate of 110.

In more detail, the pre-filter 105 uses the specific functional representation of $1-z^{-10}$, the post-filter 111 is a delta function, and the overall filter is equal to the pre-filter. In such a case, the receiver 103 can combat an impulse noise of length of up to 10 symbols, regardless of the magnitude of the impulse. The degradation of this system compared to a system without any pre-filtering when the only noise in the channel is stationary white noise is less than 0.5 dB in noise margin. Continuing to refer to FIG. 1, the adaptive equalizer and rotator unit 112 compensates for the carrier phase of the signal and for undesired parts of the inter-symbol interference (ISI) in the signal, as well as combating stationary noise components (i.e. noise that does not occur in impulses). It includes an adaptive phase loop, an adaptive equalizer and an error discriminator for generating terms used for adapting the unit 112 parameters.

The modified MLSE (Maximum Likelihood Sequence Estimation) decoder 113 applies a Viterbi MLSE process for an overall channel that is the cascade of the pre-filter (unit 105), the transmission pulse (unit 106), the transfer function of the CATV link 102, and the filters in units 109, 110, 111, and 112. Note that equalizer 112 is adapted so that it will cancel the ISI due to units 106, 102, 108, and 110, so that the overall channel is equal to the cascade of the pre-filter and post-filter; as explained above, equalizer 112 is designed to have a few non-zero taps (or one non-zero tap, in which case the MLSE is a nearest neighbor detector). The MLSE process determines the sequence of transmitted symbols that minimizes the following function, $$\underset{a}{\text{Min}} \sum_n l\left(x_n - \sum_i s_i a_{n-i}, p_n\right)$$

where $x_n$ are the outputs from equalizer and rotator unit 112, $s_i$ is the impulse response sequence of the overall filter [S(z)], $a_n$ belongs to the transmitted symbols alphabet (constellation), and $p_n$ are the estimated probabilities for occurrence of impulse noise. The sequence $p_n$ is a function that reflects the identification of high magnitude samples by the impulse identification process 200 of the impulse smoother 109, and a function of the residual error in the MLSE unit 113. The function 1 is a function that approximates the log-likelihood of the error, assuming a model of noise which is a mixture between two Gaussian processes with corresponding weights p and 1−p, and power levels equal to the power of the noise at the output of the equalizer and rotator unit 112 in the absence of impulse noise, and in the presence of impulse noise, respectively. The following l function is a good approximation to the log-likelihood for the case when the noise power during an impulse is much higher than the noise power in the absence of an impulse, $$l(x,p) = \min((x/\sigma)^2, A(p)),$$

where σ is the standard deviation of the noise at the output of the equalizer and rotator unit 112 in the absence of impulse noise, and the threshold A(p) is a decreasing function in the range $0 \leq p \leq 1$, equal to 0 for p=1 (i.e. when there is a clear indication that an impulse has occurred), and has a large value (e.g. 3) when p=0 (i.e. when there is no indication that an impulse has occurred).

This MLSE process of the present invention is different from prior art processes which do not take impulse noise into account and are designed for optimum performance with a single Gaussian noise source; therefore their structure is similar to the structure of the present invention's MLSE with the exception that $l(x,p) = x^2$.

Example: The pre-filter and post-filter pair are designed so that the overall filter is $S(z) = 1-az^{-N}$. The MLSE decoder is implemented by N−1 decoders (having N−1 sets of memory). The receiver 103 has a complexity of 16 and 256 branches per symbol for QPSK and 16 QAM respectively. The system will be able to tolerate high magnitude impulse noise, as long as the duration of the noise impulse is shorter than N symbol periods. This is because each transmitted symbol appears in two points in the received signal that are separated by N symbol periods, and further since the receiver 103 is constructed to give low weight to the segment of the signal that is contaminated by a noise impulse.

Figure 5:
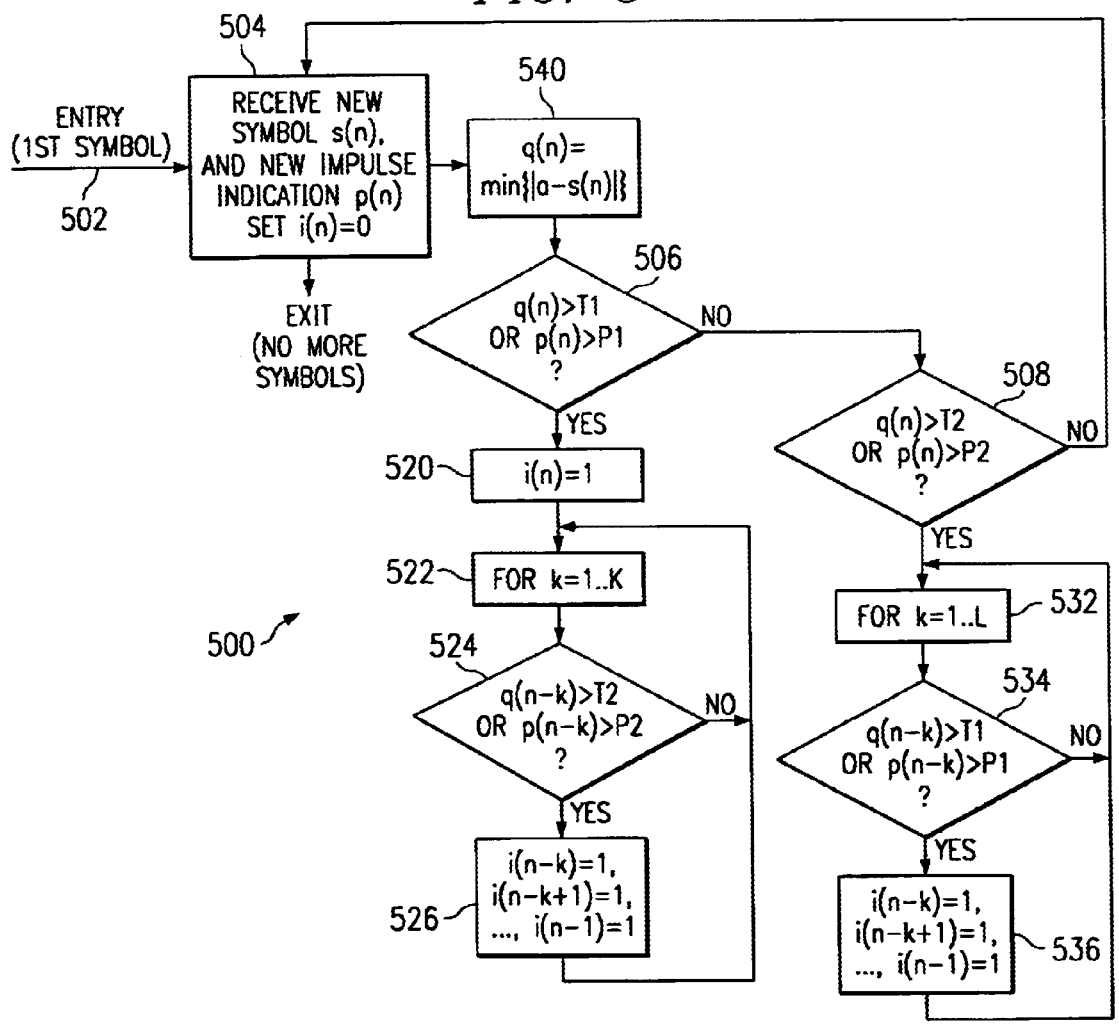
FIG. 5 illustrates a flow chart for an impulse identification process of a maximum likelihood sequence estimation (MLSE) decoder operating according to the teachings of the present invention.

FIG. 5 illustrates a flowchart for an impulse identification process 500 of an MLSE decoder 113 operating according to the teachings of the present invention. This process 500 identifies sequences of symbols having a large residual detection error. The thresholds T1 and T2 depend on the standard deviation of the stationary component of the noise, preferably in a linear relation. More particularly, if the noise's standard deviation is Vn then T1=K1*Vn and T2=K2*Vn, where K1>K2; thus, the lower the standard deviation, the lower the thresholds. Note that the notation $\min_1\{|a-s(n)|\}$ used in block 540 of FIG. 5 denotes the minimum magnitude of detection error in the n-th symbol over all possible symbols (according to the constellation of the transmitter). This means that the point on the constellation that is closest to s(n) is selected, and then the error is calculated. For example, if the possible values of a are −3,−1,1,3 and s(n) is equal to 2.7, then the closest point to 2.7 is 3 and the error is |3−2.7|=0.3. Note that i(n) equal to one denotes that its corresponding symbol is corrupted by impulse noise.

In more detail, each data sample is provided as an input to the impulse identification process 500. For each new data sample, the value of i(n) is set to zero in block 504 and then the absolute value of the data sample residual is compared to a first threshold value, T1, in block 506. If the residual value is less than this first threshold, its value is then compared to a second threshold value, T2, in block 508, where T1>T2 and both are >0. If the residual value is also less than this second threshold value, it is not identified as contaminated by a noise impulse and its corresponding i(n) is left set to zero. The value and its corresponding i(n) value are then temporarily stored for later use and use by other blocks or portions of FIG. 1.

Continuing to refer to FIG. 5, let n2 be the index of a sample that satisfies q(n2)>T1 or p(n)>P1. Let n1 be the smallest index in the range [n2−K, n2−K+1, . . . , n2−1], that satisfies the q(n1)>T2 or p(n1)>P2 test of block 524. Let n3 be the largest integer in the range [n2+1, n2+2, . . . , n2+K] that satisfies the q(n3)>T2 or p(n3)>P2 test of block 508. Then n1 is identified as the beginning of the noise burst and n3 is identified as the end of the noise burst; then the p(n) and i(n) for all n in the range [n1–n3] are set to one (blocks 526 and 536).

The output of the MLSE decoder 113 is processed by the FEC decoder unit 114, which applies a Reed-Solomon decoding process using indications, like the sequence $p_n$ from the impulse smoother 109, of data segments of extremely high magnitude and indications from the MLSE unit 113 of data segments where the residual errors have extremely large magnitudes. These indications are then converted into indications of data bytes that are suspected of having more than a 50% error probability. The FEC decoder uses this indication for the position of suspected bytes in its FEC decoding algorithm. This increases the maximum length of error bursts that can be corrected by a factor of two as compared to a conventional FEC decoder. The output of the FEC decoder is the transmitted data sequence 115, which is transferred to the CATV headend.

Using well known techniques, the controller unit 116 monitors the noise conditions of the channel, and based on those conditions sets the parameters of the transmitter 101 and receiver 103 accordingly, in order to make a good compromise between stationary noise and impulse noise. More particularly, the controller unit 116 monitors the rate of occurrence and the statistics of duration of noise impulses, the level and the spectrum of stationary noise, and the amount of errors corrected by the FEC decoder 114, again using well known techniques. It also monitors the impulse-response-sequence of the channel. Based on the noise conditions and the impulse response of the channel, the controller 116 sets the following parameters for the transmitter 101, constellation type (i.e. QPSK or 16 QAM), pre-filter impulse response sequence, FEC encoder block size and code rate, and power level. The controller 116 sends these parameters to the transmitter through a control channel 117, which is a sub-link of CATV downstream direction link. The controller 116 also sets the parameters of the receiver 103 including thresholds T1, T2, A, B and C of the impulse smoother unit 109, the impulse response sequence of the post-filter 111, the parameter σ and the threshold function A(p) of the MLSE decoder 113 (as well as T1 and T2 of 113), and the parameter of the decision rule on byte-erasure in the FEC decoder unit 114.

The following items differentiate of the teachings of the present invention from the prior art.
Transmitter:
1. A pre-filter which causes time diversity by deliberately injecting ISI in the transmitted signal.
Receiver:
2. An impulse smoother for identification and non-linear smoothing of noise impulses.
3. A post-filter which compensates or partially compensates for the ISI caused by the pre-filter and smears noise impulses over time.
4. A burst identifier (as depicted in blocks 109 and 113) for identification of sequences of large noise values.
5. A modified MLSE decoder using a non-square error criterion that gives low weight to errors of high magnitude and that modifies the error criterion according to indication from a device that identifies impulse noise (e.g. the impulse noise smoother, or the burst identifier).
6. A modified FEC decoder for decoding FEC code with erasure indication of data bytes that are expected to have more than 50% error probability.
7. A controller for setting the parameters of the transmitter and the receiver based on monitoring noise conditions and impulse response of the channel. The controller is based on standard, well known techniques. The white noise is averaged, while the rate of the impulses, as well as their power is preferably recorded. The innovation is to use these measurements to set all the parameters, as described earlier herein.

Although the invention has been described in detail herein with reference to its presently preferred embodiment, it is to be understood that this description is by way of example only, and is not to be construed in a limiting sense. It is to be further understood that that numerous changes in the details of the embodiments of the invention, and additional embodiments of the invention, will be apparent to, and may be made by, persons of ordinary skill in the art having reference to this description. It is contemplated that such changes and additional embodiments are within the spirit and true scope of the invention as defined in the appended claims.

What is claimed is:
1. A digital receiver, comprising:
   a demodulator for receiving an input data signal, down converting said signal, and sampling said signal to provide an input data stream,
   a smoother for receiving said input data stream, identifying data samples that are likely contaminated by impulse noise, and attenuating data samples likely contaminated by impulse noise,
   a filter and timing recovery portion for applying a square-root raised cosine filter to data samples output by said smoother and for determining the sample rate and sample clock phase,
   a filter for filtering the output from said filter and timing recovery portion having an impulse response sequence with a small peak to average ratio that attenuates the effect of impulse noise with a duration less than the duration of a symbol,
   an adaptive equalizer for receiving the output of said filter and compensating for carrier phase, undesired intersymbol interference, and stationary noise components,
   a modified maximum likelihood sequence estimation (MLSE) decoder for applying a viterbi MLSE using a plurality of non-zero taps to determine a sequence of symbols in a data stream received from said adaptive equalizer, and
   a forward error correction (FEC) decoder that utilizes indications of samples contaminated with noise from said smoother to perform error correction on said data stream.
2. The digital receiver of claim 1, wherein said adaptive equalizer also identifies data samples that are likely contaminated by impulse noise.
3. The digital receiver of claim 2, wherein forward error correction (FEC) decoder also utilizes indications of samples contaminated with noise from said adaptive equalizer to perform error correction on said data stream.
4. A method for detecting a noise impulse in a data stream, comprising:

associating an indication with a data sample, comparing the absolute value of the amplitude of said data sample with a first preselected threshold value, setting said indicator to a first predetermined value if said amplitude is greater than said first preselected threshold value, comparing said amplitude to a second preselected threshold value if said amplitude is less than said first preselected threshold value, setting said indicator to a second predetermined value if said amplitude is greater than said second preselected threshold value, and setting said indicator to a third predetermined value if said amplitude is less than said second preselected threshold value.

5. The method of claim 4, further comprising:

conducting a comparison of the absolute value of the amplitude of each data sample in a first sequence of a preselected number of data samples immediately preceding a data sample whose amplitude is greater than said first preselected threshold value to said second threshold value, and setting the indicator associated with each data sample to said second predetermined value if said amplitude is greater than said second preselected threshold value or otherwise setting said indicator to said third predetermined value.

6. The method of claim 5, further comprising:

conducting a comparison of the absolute value of the amplitude of each data sample in a second sequence of a preselected number of data samples immediately following the last data sample whose amplitude is greater than said first preselected threshold value to said second threshold value, and setting the indicator associated with each data sample to said second predetermined value if said amplitude is greater than said second preselected threshold value or otherwise setting said indicator to said third predetermined value.

7. The method of claim 6, further comprising:

determining said first and second preselected threshold values as a function of the amount of and types of noise found in said data stream.

8. A method for attenuating a noise impulse in a data stream, comprising:

determining a residual error value for a data sample, comparing the absolute value of the amplitude of said residual error value with a first preselected threshold value, modifying the amplitude of said data sample to a first predetermined value if said amplitude is greater than said first preselected threshold value, comparing said amplitude to a second preselected threshold value if said amplitude is less than said first preselected threshold value, and modifying the amplitude of said data sample to a second predetermined value if said amplitude is greater than said second preselected threshold value.

* * * * *